United States Patent [19]
Morita

[11] Patent Number: 5,154,287
[45] Date of Patent: Oct. 13, 1992

[54] CASSETTE ACCOMMODATING CASE

[75] Inventor: Kiyoo Morita, Kanagawa, Japan

[73] Assignee: Fuji Photo Film Co., Ltd., Kanagawa, Japan

[21] Appl. No.: 815,144

[22] Filed: Dec. 31, 1991

[30] Foreign Application Priority Data

| Jan. 10, 1991 | [JP] | Japan | 3-3352[U] |
| Jan. 10, 1991 | [JP] | Japan | 3-3353[U] |
| Feb. 19, 1991 | [JP] | Japan | 3-13517[U] |
| Feb. 20, 1991 | [JP] | Japan | 3-13577[U] |

[51] Int. Cl.$^5$ .................................. B65D 85/575
[52] U.S. Cl. .................................. 206/387; 206/493
[58] Field of Search .................. 206/387, 493; 220/522

[56] References Cited

U.S. PATENT DOCUMENTS

| 3,638,788 | 2/1972 | Solomon | 206/387 |
| 3,640,379 | 2/1972 | Weingarden | 206/387 |
| 3,896,929 | 7/1975 | Mills | 206/493 |
| 4,235,334 | 11/1980 | Ahn | 206/387 |

FOREIGN PATENT DOCUMENTS

| 0415083 | 3/1991 | European Pat. Off. | 206/387 |
| 2106807 | 9/1971 | Fed. Rep. of Germany | 206/387 |
| 2221784 | 10/1974 | France | 206/387 |
| 0124586 | 5/1989 | Japan | 206/387 |

*Primary Examiner*—Jimmy G. Foster
*Attorney, Agent, or Firm*—Sughrue, Mion, Zinn, Macpeak & Seas

[57] ABSTRACT

A cassette accommodating case adapted to store a plurality of magnetic tape cassettes includes a cover member having a pocket for accommodating end portions of the plurality of magnetic tape cassettes and a casing member having rotation stopping projections. The cover member and the casing member are pivotally assembled. The pocket includes a wall portion and a first recess portion for receiving a relatively thick portion of a first magnetic tape cassette formed on the wall portion. A second recess portion for receiving a first portion of a second magnetic tape cassette is formed at a position apart from the first recess portion on a wall portion facing the wall portion of the pocket. A positioning member for positioning a side of at least the second magnetic tape cassette is provided inside the case, such that the plurality of magnetic tape cassettes are accommodated therein while superposed upside down. In the case may have a pocket member for receiving end portions of a plurality of magnetic tape cassettes, and first and second casing members each having rotation stopping projections and each coupled to the pocket member by pivotally attached portions formed on the pocket member. With the invention, a plurality of cassettes may be stored in a single case, with a compact structure resulting.

10 Claims, 12 Drawing Sheets

CASSETTE ACCOMMODATING CASE

BACKGROUND OF THE INVENTION

The present invention relates to a magnetic tape cassette accommodating case, and more particularly to an improved case for storing a plurality of audio magnetic tape cassettes.

A magnetic tape cassette used for audio recording or playback, etc., is typically stored in a dedicated case (hereinafter referred to as a "cassette accommodating case") which is made of plastic when the cassette is not in use.

Since a magnetic tape cassette both has a front opening end into which a magnetic head, etc., are inserted when the cassette is installed in a recording/reproducing apparatus and the magnetic tape traverses the front opening end, the case is used not only to prevent dust from entering the cassette from the front opening end, but also to protect both the magnetic tape exposed at the front opening end and the cassette as a whole.

FIG. 24 shows a basic construction of a conventional cassette accommodating case 31 which includes a cover member 32 having a pocket 34 and a casing member 35 having a pair of rotation stopping projections 7. The pocket 34 serves as a space into which the front opening end of a magnetic tape cassette 20 is inserted. The pair of rotation stopping projections 7 are inserted into shaft insertion holes 22 of the cassette 20. The cassette accommodating case 31 is designed so that the casing member 35 and the cover member 32 can be opened and closed like a door by causing support projections to be fitted with through holes. The support projections are internally arranged on lateral walls of the casing member 35 and the through holes are provided on lateral walls close to the end wall of the pocket member 34.

The cassette accommodating case 31 is dimensionally designed so that its thickness between two wall portions 33, 36 confronting the respective upper and lower surfaces of the cassette 20 is set to a value corresponding to the thickness of a relatively thick portion 21 forming the front opening end of the cassette 20. Thus, the cassette accommodating case 31 has a thickness $l_1$ significantly greater than the thickness $l_2$ of the thin portion excluding the thick portion 21. Therefore, the cassette accommodating case 31 requires a storage space comparatively larger than that required for storing a bare cassette (i.e., a cassette without the thick portion).

Thus, if a user wishes to store the cassette 20 in a limited space, e.g., if one wishes to store as many cassettes as possible within the console box of a motor vehicle, there are often occasions when the cassettes are not accommodated in cassette accommodating cases 31. When a cassette is stored without using the case 31, the cassette is exposed not only to dust, which encourages deterioration of the magnetic tape recording/reproduction performance, but also to damage due to direct impact from droppage of the cassette, etc.

To overcome the above problems, the present applicant has proposed several thin cassette accommodating cases (e.g., as disclosed in Japanese Utility Model Unexamined Publications Nos. 163279/1985 and 52782/1988).

In these thin cassette accommodating cases, a cassette is accommodated in the case upside down with respect to a cassette accommodated in the conventional case, so that its thick portion is positioned on the opened side of the cassette accommodating case and recesses for receiving the thick portion are formed on both upper and lower walls of the case.

More specifically, an improved cassette accommodating case disclosed in Japanese Utility Model Unexamined Publication No. 52782/1988 and as shown in FIG. 23 has a cassette accommodating case 11 arranged so that a cover member 12 having a pocket 14 is pivotally attached to a casing member 15 in a manner similar to the conventional cassette accommodating case. Recesses 18 for receiving the relatively thick portion 21 of a cassette are formed on the opened side of wall portions 13, 16 of the cover member 12 and the casing member 15, respectively, and the wall portions extensively confront the upper and lower surfaces of the cassette.

The recesses 18 are formed to confront each other toward the interior of the case to such a depth and shape as to receive the thick portion 21 (also referred to as a "trapezoidal portion").

Accordingly, the cassette accommodating case 11 can be formed so that the thickness between the wall portions 13, 16 is only slightly larger than the thickness $l_2$ excluding the thick portion 21, thus achieving a thin structure compared to the conventional case. Therefore, the storage space can be reduced and the utility as a portable case is improved as compared to the conventional case.

However, the applicants have found that such an improved case still has problems which must be overcome.

Specifically, a single cassette cannot always record entire pieces or compilations of music, e.g., classical music recordings, or a plurality of music pieces arranged in an "album." If the music is long, commercially two or more cassettes are employed to record the music, and they are sold as a set. Thus, a conventional cassette accommodating case which can contain only one cassette requires a user to be diligent in keeping a set of cassettes together. This is an inconvenience. In such cases, it is not ideal to store the music in a plurality of cassettes from the standpoint of orderly storage since the music is recorded in two or more cassettes and must be stored as a set.

Therefore, a user is inconvenienced in always maintaining a set of related cassettes together. For example, for language learning tapes and the like, which must be arranged and stored according to a learning program, a dedicated box is usually provided to store the cassettes.

Also, as the case structures become thinner, their rigidity must be designed properly, and the protection and handling at the time of opening and closing cassettes must be considered.

Further, generally the cassette accommodating case has such a structure as to cover the entire cassette, thus providing excellent protection for the cassette as a dustproof case and a shock eliminator. Particularly, in audio compact cassettes having an opening for inserting the magnetic head on their front end, the magnetic tape is exposed to the user's fingers, and thus a cassette accommodating case is a must to carry the cassettes.

A similar consideration to those discussed above is that, in the case of a commercially available magnetic tape cassette in which classical music, etc., is recorded, a compilation or a piece of music that is as long as, e.g., two discs, is recorded in two or more magnetic tape cassettes and sold as a set. However, the conventional cassette accommodating case can house only one magnetic tape cassette, and users, having to store tapes as a set to keep them together, find the conventional case very inconvenient. As discussed above, this is particularly true for language learning tapes, etc., which have to be kept in a predetermined sequence, and thus care is taken by providing a dedicated box.

Cassette accommodating cases that can accommodate a plurality of magnetic tape cassettes simultaneously are disclosed in Japanese Utility Model Examined Publications Nos. 52781/1982 and 16541/1985, Japanese Utility Model Unexamined Publications Nos. 63874/1984, 118168/1984, 189778/1984, 189779/1984, and 137787/1988, etc. Each of these cassette accommodating cases has a plurality of accommodating portions formed integrally with each other and a pair of covering members arranged to be opened and closed to cover the respective accommodating portions, so that a plurality of magnetic tape cassettes are accommodated to be superposed either in the same direction or upside down.

However, most cassette accommodating cases in which a plurality of magnetic tape cassettes are received simultaneously as described above have such a structure that the conventional cases accommodating a single cassette are simply overlapped, and, as a result, require a large storage space. Specifically, in a cassette accommodating case that receives a set of magnetic tape cassettes by overlapping them in the same direction, the distance between the wall portions of the confronting cover members is set to a distance corresponding to a thickness which is twice the thickness of a trapezoidal portion, which is a relatively thick portion, as mentioned above, of the magnetic tape cassette to be accommodated.

Also, in a cassette accommodating case that receives a set of magnetic tape cassettes by superposing them upside down, the distance between the wall portions of the confronting cover members is set to a distance corresponding to a thickness that is equal to the sum of the thickness of the trapezoidal portion of a magnetic tape cassette to be accommodated and the thickness of the cassette other than its trapezoidal portion. Thus, the thickness of such cassette accommodating cases becomes quite large compared to the thickness of the portion of the cassette other than its relatively thick portion. Since these cassette accommodating cases are generally stored while arranged upright so that the labels on their spines can be seen, the thick cases require a large storage space.

SUMMARY OF THE INVENTION

The present invention has been designed to overcome the above-described problems of the conventional cases. Accordingly, one object of the invention is to provide a cassette accommodating case which can accommodate a plurality of cassettes and which has a generally thin structure and which provides convenient storage.

To achieve the above and other objects, a first embodiment of the inventive magnetic tape cassette accommodating case includes a cover member having a pocket for receiving end portions of a plurality of magnetic tape cassettes and a casing member having rotation stopping projections, with the cover member and the casing member being pivotally assembled. In such a magnetic tape cassette accommodating case, a first recess portion for receiving the thick portion of a first magnetic tape cassette is formed on a small wall portion defining the pocket and a second recess portion for receiving the thick portion of a second magnetic tape cassette is formed at a position apart from the first recess portion on a large wall portion facing the small wall portion. A mechanism for positioning the front-/rear side of at least the second magnetic tape cassette is provided inside the case, so that the two magnetic tape cassettes can be accommodated therein while superposed upside down with hub holes of the two magnetic tape cassettes substantially aligned.

The inventive cassette accommodating case can accommodate two magnetic tape cassettes therein by inserting the cassettes upside down with respect to each other. To insert the cassettes, the thick portion of one of the cassettes is received in the second recess formed on the pocket, while the thick portion of the other cassette is received in the first recess formed on the casing member opposite to the pocket. As a result, the two cassettes are superposed to stagger their thick portions and to have their respective thick portions received in the recesses. Thus, the case itself can be formed into a relatively thin structure even if the two cassettes are superposed, thereby reducing the cassette accommodating space.

In a second embodiment according to of the invention also directed to achieving the above object, the magnetic tape cassette accommodating case includes a cover member having a pocket for receiving end portions of magnetic tape cassettes and a casing member having rotation stopping projections, with the cover member and the casing member being pivotally assembled.

A second recess for receiving the thick portion of a second magnetic tape cassette is formed on a large wall portion that defines the pocket and faces a small wall portion, the second magnetic tape cassette being placed on the side of the large wall portion. A first recess for receiving the thick portion of a first magnetic tape cassette is formed on a portion close to the opening/closing end of the casing member, the first magnetic tape cassette being placed on the side of the casing member. A mechanism for positioning the front/back sides of the first magnetic tape cassette is provided inside the case, so that the two magnetic tape cassettes can be accommodated therein while superposed upside down with respect to each other with hub holes thereof substantially aligned.

The cassette accommodating case of the second embodiment of the invention also enables two magnetic tape cassettes to be accommodated therein by putting them in upside down with respect to each other. To insert the plurality of cassettes, the thick portion of one of the cassettes (e.g., the second magnetic tape cassette) that is placed on the cover member side is accommodated in the second recess formed on the large wall portion of the pocket, while the relatively thick portion of the other cassette is accommodated in the first recess formed on the casing member. As a result, the two cassettes are superposed so as to stagger their thick portions and have their respective thick portions accommodated in the recesses. Thus, the case can be formed into a thin structure even if the two cassettes are superposed, thereby reducing the cassette accommodating space.

The above object also is achieved by a magnetic tape cassette accommodating case according to a third embodiment of the invention which has a pocket member for receiving end portions of a plurality magnetic tape cassettes, and first and second casing members. Each of the first and second casing members have rotation stopping projections and the pocket member and the first and second casing members are arranged to be opened and closed by pivotally attached portions formed on sides of the pocket member. In such a magnetic tape cassette accommodating case, the internal thickness of the pocket member is selected to have a value large enough to snugly accommodate a plurality of magnetic tape cassettes superposed upside down with respect to each other so that the relatively thick portion of one of the plurality of magnetic tape cassettes does not overlap the thick portion of a second magnetic tape cassette.

The above object can also be achieved by a magnetic tape cassette accommodating case, in which the internal thickness of the pocket member is selected to have a value large enough to snugly accommodate thin portions of two magnetic tape cassettes superposed upside down with respect to each other so that the relatively thick portion of one of the magnetic tape cassettes does not overlap the thick portion of the other magnetic tape cassette. A first recess for receiving the thick portion of a first magnetic tape cassette is formed on an internal wall portion on the side of the first casing member, and a second recess for receiving the thick portion of a second magnetic tape cassette is formed at a position close to an opening and closing end of the second casing member. The first magnetic tape cassette is located on the internal wall portion side and the second magnetic tape cassette is located on the side of the second casing member.

A fourth embodiment of the invention, also designed to achieve the above object, is applied to a magnetic tape cassette accommodating case which includes a pocket for receiving an end portion of a magnetic tape cassette and a casing member for receiving a portion of the magnetic tape cassette other than the end portion received in the pocket In such a magnetic tape cassette accommodating case, the pocket has a partitioning member interposed therein to form two pocket portions. The partitioning member has at a position thereof opposite to the pocket a recess for commonly receiving trapezoidal portions of two magnetic tape cassettes that are inserted into the pocket portions. The pocket is pivotally coupled to a pair of casings respectively confronting the pocket portions, and each of the casings not only has a recess for individually receiving the trapezoidal portion of each of the magnetic tape cassettes at a position thereof confronting the recess formed on the partitioning member, but also has finger rests at positions spaced from each other along the length of the case for opening and closing the case. As a result, the magnetic tape cassette accommodating case can efficiently store the two magnetic tape cassettes.

Another aspect of the invention is applied to the above magnetic tape cassette accommodating case, in which pairs of rotation stopping projections formed on the casings to confront each other are engaged with each other while being inserted through the partitioning member.

According to the above construction, the lower ends of the two magnetic tape cassettes are inserted into the pocket portions provided at both sides of an end, or the lower end, of the partitioning member which has a plate-like, etc., form, and the confronting trapezoidal portions of the two magnetic tape cassettes are received commonly by the recesses formed on, e.g., the upper end of the partitioning member. Further, as the casing members are closed, the trapezoidal portions of the two magnetic tape cassettes are received by the recesses formed on the respective casing members.

As a result, the trapezoidal portions of the two magnetic tape cassettes are accommodated in both the recess formed on the partitioning member and the recesses respectively formed on the pair of casing members, thereby allowing the magnetic tape cassettes to have a thin structure.

While the trapezoidal portions of the magnetic tape cassettes are located on the opened sides of the pair of casing members according to the above construction, the finger rests for opening and closing the pair of casing members are arranged at positions spaced from the recesses that receive the trapezoidal portions. Thus, it is unlikely that the trapezoidal portions of the magnetic tape cassettes will be touched by the operator's fingers when opening and closing the pair of casing members. This contributes to preventing the magnetic tapes from slackening and becoming contaminated by the operators' fingers.

Further, the above objects of the device can be achieved by a magnetic tape cassette accommodating case which includes a cover member having a pocket for accommodating an end portion of a magnetic tape cassette and a casing member having rotation stopping projections, the cover member and the casing member being pivotably assembled. In such a magnetic tape cassette accommodating case, the rotation stopping projections are provided so that a plurality of magnetic tape cassettes can be superposed upside down directly and so that hub holes of the respective magnetic tape cassettes can be aligned simultaneously, and recess portions are formed on inner surfaces of the case so that the thick portions of the outermost magnetic tape cassettes out of the plurality of magnetic tape cassettes can be received therein.

The cassette accommodating case of the device has the feature that a plurality of magnetic tape cassettes can be accommodated therein so as to superpose them upside down. In placing them, the thick portions of the outermost cassettes are received in the recesses formed on the inner surfaces of the case. As a result, the plurality of cassettes are superposed directly so as to stagger their thick portions. Thus, the accommodating space can be reduced. In addition, with the thick portions being received in the respective recesses, the case itself can be formed into a thin structure, thereby allowing the cassette accommodating space to be further downsized.

DESCRIPTION OF THE PREFERRED EMBODIMENTS

Figure 1:
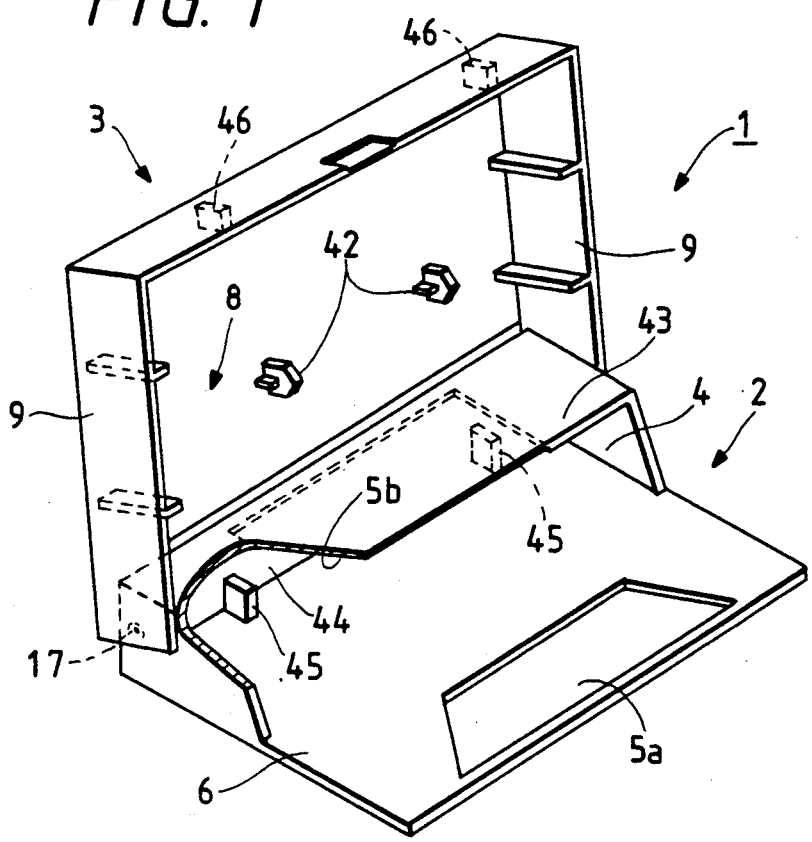
FIG. 1 is a perspective view of a cassette accommodating case according to a first embodiment of the present invention.

A first embodiment of the inventive apparatus will now be described with reference to FIGS. 1 to 3 in which a cassette accommodating case 1 has a cover member 2 having a pocket and a casing member 3 having a pair of rotation stopping projections 42. The pocket 4 defines a space into which the rear end and the front end of two cassettes 20a, 20b, the front end being the thick portion 21, can be inserted simultaneously while superposed upon one another. The rotation stopping projections 42 are inserted into shaft insertion holes 22 of the superposed cassettes 20a, 20b and are arranged on a wall portion 8 that forms the casing member 3.

The cassette accommodating case 1 is designed so that the casing member 3 and the cover member 2 can be opened and closed like a door with its axis extending along the length by causing support projections 17 to be fitted with through holes. The support projections are internally arranged on lateral walls of the casing member 3, and the through holes are provided on lateral walls close to the end wall of the pocket 4.

Figure 2:
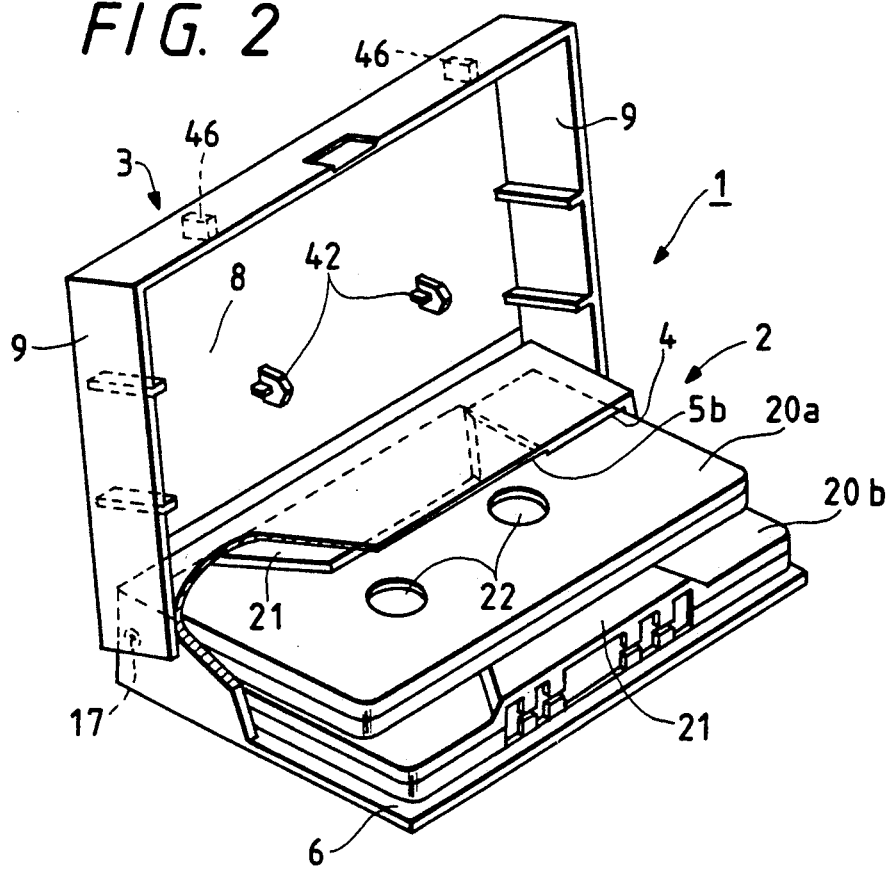
FIG. 2 is a perspective view showing a state of accommodating cassettes in the case of the invention.

A recess 5a (e.g , a second recess) is formed at the front end of a large wall portion 6 of the cover member 2 which is large enough to accommodate a relatively thick portion 21 of a second magnetic tape cassette 20b, as shown in FIG. 2. On the other hand, recess 5b (e.g., a first recess) is formed on the internal wall surface of a relatively small wall portion 43 which is part of the framing walls for forming the pocket, i.e., on a surface confronting the large wall portion 6. The recess 5b is large enough to accommodate the thick portion 21 of the first magnetic tape cassette 20a. Both recesses 5a, 5b are arranged to receive the thick portions upside down with respect to each other when accommodating both magnetic tape cassettes 20a, 20b which are superposed upside down with respect to one another. The recess 5a corresponds to a second recess, and the recess 5b corresponds to a first recess, as described above.

A pair of ribs 45 are arranged at the right-angled corner formed between the large wall portion 6 and a vertical wall portion 44 of the pocket 4. Each rib 45 serves not only as a means for positioning the second magnetic tape cassette 20b, but also as a means for aligning the respective shaft insertion holes 22 when the two magnetic tape cassettes 20a, 20b are superposed. The casing member 3 is also provided with ribs 46 so that the cassettes can be snugly accommodated in the case.

That is, the shaft insertion holes 22 are not formed to extend along the centerline of the magnetic tape cassettes 20a, 20b in the front/rear direction, or width direction, but instead along a line that slightly deviates toward the rear end. Thus, if the two magnetic tape cassettes 20a, 20b are superposed so that their contours completely coincide, their shaft insertion holes 22 cannot be aligned, thereby not allowing the rotation stopping projections 42 formed on one side of the case to be inserted into both cassettes. Hence, the ribs 45 are provided as a means for aligning the shaft insertion holes 22.

When accommodating the magnetic tape cassettes 20a, 20b in the case, the thick portion 21 of, e.g., the first cassette 20a (shown as being the upper cassette in FIG. 2), is inserted into the pocket 4 so as not to abut against the ribs 45, and then the second cassette 20b is inserted upside down with the second cassette 20b between the first cassette 20a and the large wall portion 6. By thus accommodating the cassettes, the recess 5b can readily receive the thick portion 21 of the first cassette 20a even if the recess 5b is not extended as far as to the edge of the small wall portion 43, as shown in FIG. 2.

The cassettes can be inserted into the case one at a time by following a procedure reverse to that described above, or simultaneously. To insert the cassettes one-by-one in the reverse procedure, the thick portion 21 of the second cassette 20b is accommodated in the recess 5a. Under this condition, no gap for inserting the thick portion 21 of the first cassette 20a is provided between the upper surface of the second cassette 20b (the lower cassette as shown in FIG. 2) and the small wall portion 43 forming the pocket 4. In this case, the small wall portion 43 permits the first magnetic tape cassette 20a (e.g., the upper cassette) to be inserted into the pocket 4 by utilizing proper elasticity. The same procedure applies when the two cassettes are inserted simultaneously together while superposed upon one another. Since pocket 4 having a structure which is elastically deformed is not desirable, the recess 5b for receiving the thick portion 21 of the first magnetic tape cassette 20a may be extended to the edge of the small wall portion 43 to admit the cassette without any interference.

The two magnetic tape cassettes 20a, 20b are accommodated while superposed within the cover member 2 of the cassette accommodating case 1, as shown in FIG. 2. By closing the cover member 2, the rotation stopping projections 42 get inserted into the respective shaft insertion holes 22 of each cassette to accommodate the cassettes securely in the case.

Figure 3:
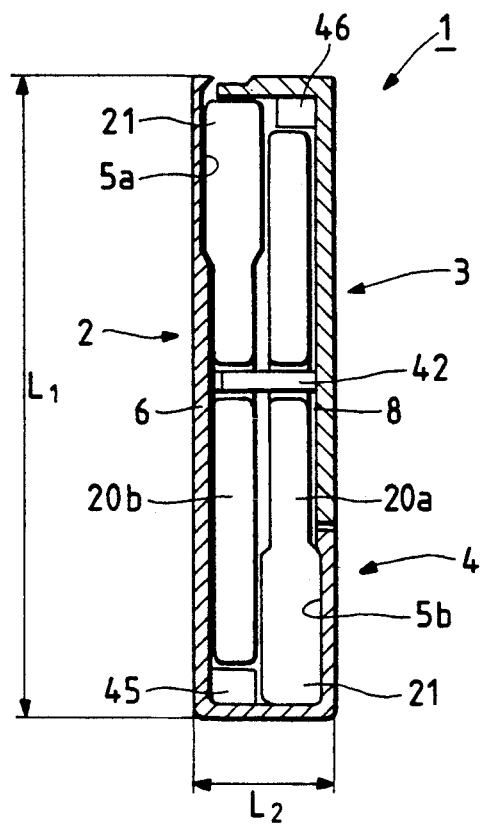
FIG. 3 is a sectional view of a main portion of the inventive case with a plurality of cassettes being accommodated therein.

FIG. 3 is a sectional view of a main portion of the case with the cassettes accommodated. In FIG. 3, the shaft insertion holes 22 of the two cassettes 20a, 20b are aligned by the ribs 45, and the rotation stopping projections 42 are inserted into both the aligned shaft insertion holes 22.

An exemplary size of the case 1 is described hereinbelow. The length $L_1$, of the case 1 is made longer by about 5.8 mm, which is the dimension of the rib 45, compared to the size of the conventional case. However, the thickness $L_2$ is made smaller by about 6 mm compared to the combined thickness of two conventional cases by arranging the recesses 5a, 5b to be spaced from each other e.g., diagonally apart, to accommodate the two cassettes upside down with respect to each other. The volume of the case 1 is only about 1.53 times the volume of the conventional case accommodating only a single cassette, although the case 1 of the invention accommodates two cassettes. Thus, the case 1 can accommodate the two cassettes 20a, 20b with an increase in volume of only about 53% with respect to the volume of the conventional single cassette accommodating case. Hence, the space for storing cassettes can be reduced, and two cassettes 20a, 20b that are relevant to each other as a set can be easily stored, thereby contributing to convenient tape cassette storage. The operation of removing both cassettes 20a, 20b by opening the case 1 is simple since the cassettes are "stepped" or uneven (e.g., staggered) with respect to each other.

In the above embodiment, the two ribs 45 are provided so that the shaft insertion holes 22 of the two cassettes 20a, 20b can be aligned perfectly. With this construction, the rotation stopping projections 42 can be made similarly to those of the conventional cases except that their height is increased. However, embodiments of the inventive case are not limited to the above example and instead of the ribs 45, a step may be formed on the case wall to project toward the case's interior.

Further, the cassettes 20a, 20b can be superposed to allow their contours to coincide with each other if the projections of the ribs 45 are made shorter. In such a case, the opening of each shaft insertion hole 22 has a flat form as shown by the solid line in FIG. 4, providing a space that is aligned, although not perfectly. Therefore, the rotation stopping projections can be inserted into the openings shown by the solid line in FIG. 4 as long as the rotation stopping projections are formed so flat as to be compatible with the shaft insertion holes 22, and thus the reels are similarly prevented from being rotated. If both front and rear ends of the cassettes are set flush together, the ribs 45 become unnecessary, thereby decreasing the structural components of the cassette accommodating case 1.

As described above, the cassette accommodating case of the present invention according to the first embodiment is arranged so that two cassettes can be superposed upside down with respect to each other with one of the thick portions of the cassettes received in the recess formed on the small wall portion of the pocket and the other thick portion accommodated in the recess formed toward the front end side of the casing member.

Therefore, not only a plurality of cassettes can be superposed in a single cassette accommodating case, but also cassettes containing related, lengthy music pieces can be stored together in a group, thus providing utility and convenient storage as compared to the conventional cases in which a plurality of related cassettes have to be stored individually.

The arrangement of the recesses to receive the thick portions of the plurality of cassettes contributes to reducing the general thickness of the cassette accommodating case, thereby providing the advantages that less storage space is required and the like.

A second embodiment of the device will now be described with reference to FIGS. 5 to 7 in which a cassette accommodating case 201 has a cover member 202 having a pocket and a casing member 203 having a pair of rotation stopping projections 242. The pocket 204 defines a space into which two magnetic tape cassettes 220a, 220b can be inserted simultaneously while the rear end of one of the cassettes and the front end of the other cassette are superposed upon one another. The rotation stopping projections 242 are inserted into shaft insertion holes 222 of the superposed cassettes 220a, 220b and are arranged on a wall portion 208 that forms the casing member 203.

The cassette accommodating case 201 is designed so that the casing member 203 and the cover member 202 can be opened and closed like a door with its axis extending along the length by causing support projections 217 to be fitted with through holes, the support projections being internally arranged on lateral walls of the casing member 203 and the through holes being provided on lateral walls close to the end wall of the pocket 204.

Figure 6:
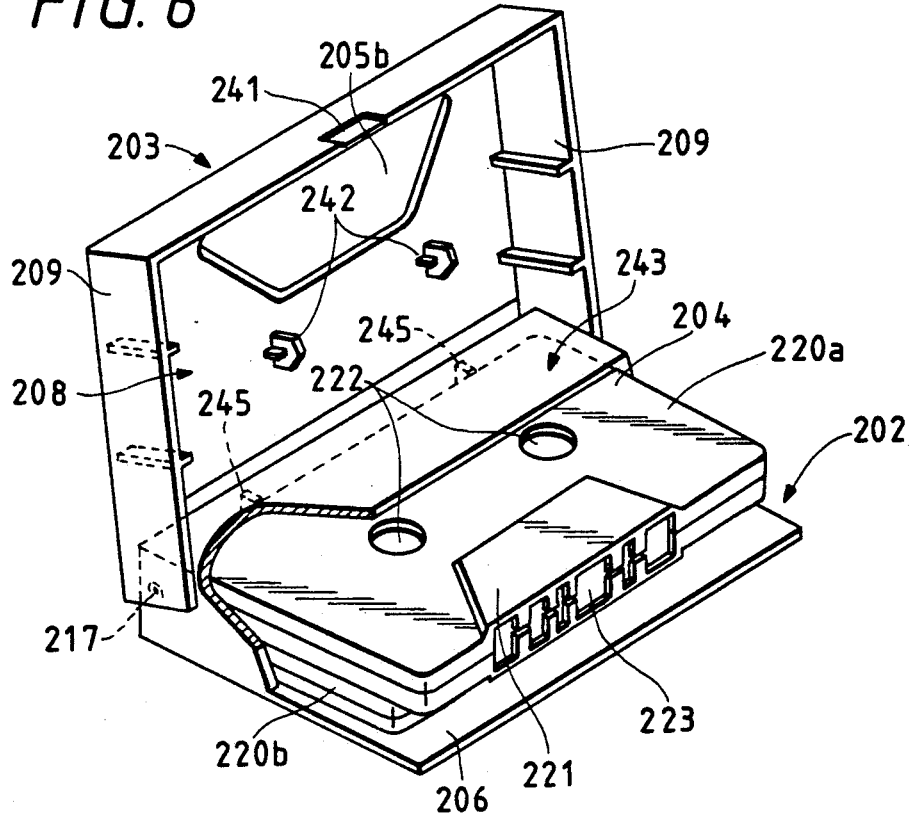
FIG. 6 is a perspective view showing a state of accommodating cassettes in the case according to the second embodiment of the invention.

A recess 205a (e.g., a second recess) is formed in a large wall portion 206 (referred to as such relative to a small wall portion 243 described below) of the cover member 202, which is an area forming the pocket 204 which is large enough to accommodate a relatively thick portion 221 of a second magnetic tape cassette 220b, as shown in FIG. 6. On the other hand, a recess 205b (e.g., a first recess) is formed at a portion closer to the opening/closing end on the wall portion 208 of the casing member 203. The recess 205b is large enough to accommodate the thick portion 221 of a first magnetic tape cassette 20a (e.g., an upper cassette as shown in FIG. 6). Both recesses 205a, 205b are arranged to receive the thick portions upside down when accommodating both magnetic tape cassettes 220a, 220b to be superposed upside down.

A pair of ribs 245 are arranged at the right-angled corner formed between the small wall portion 243 and a vertical wall portion 244 of the pocket 204. Each rib 245 serves not only as means for positioning the first magnetic tape cassette 220a, but also as means for aligning the respective shaft insertion holes 222 when the two magnetic tape cassettes 220a, 220b are superposed.

That is, the shaft insertion holes 222 are not formed to extend along the centerline of the magnetic tape cassettes in the front/rear direction, or width direction, but along a line that is slightly deviated toward the rear end. Thus, if the two magnetic tape cassettes 220a, 220b are superposed so that their contours completely coincide, their shaft insertion holes 222 cannot be aligned, thereby not allowing the rotation stopping projections 242 formed on one side of the case to be inserted into both cassettes. Hence, the ribs 245 are provided as means for aligning the shaft insertion holes 222.

When accommodating the magnetic tape cassettes in the case, the relatively thick portion of, e.g., the second cassette 220b that comes to the lower side is inserted into the pocket 204 to correspond to the recess 205a, and then the first cassette 220a is inserted upside down with the second cassette 220b between the second cassette 220b and the small wall portion 243.

Accordingly, as shown in FIG. 6, the two magnetic tape cassettes are accommodated while superposed within the cover member 202 of the cassette accommodating case 201. By closing the cover member 202, the rotation stopping projections 242 get inserted into the respective shaft insertion holes to securely accommodate the cassettes in the case.

Figure 7:
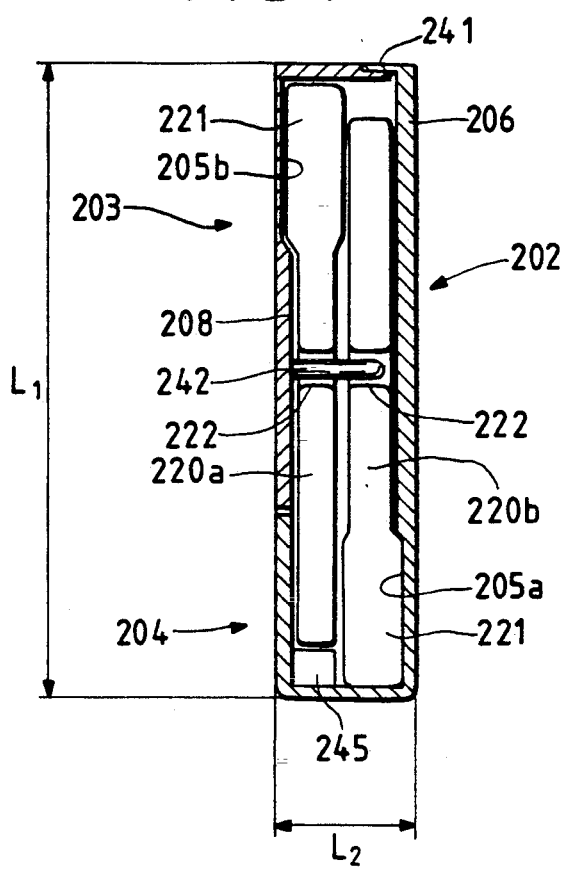
FIG. 7 is a sectional view of a main portion of the case with the cassettes being accommodated therein.

FIG. 7 is a sectional view showing how the cassettes are accommodated in the form of the main portion of the case taken along a wall portion 209. In FIG. 7, the shaft insertion holes 222 of the two cassettes are aligned by the ribs 245, so that the rotation stopping projections 242 are inserted into the shaft insertion holes 222.

The size of the case 201 is similar to that described above regarding the first embodiment, with similar features and advantages accruing thereto.

Removing the cassettes by opening the case is assisted by the two cassettes being stepped or staggered. Additionally, the cassette 220b placed on the side of cover member 202 has its opening 223 facing away from the portion at which a user puts his fingers when opening and closing the case (e.g., the portion facing a recess 241 on the external surface of the casing member 203), so that the case 201 can be opened and closed without touching the magnetic tape (not shown) and the like exposed at the opening 223. This alleviates problems such as the operator's fingers contaminating the tape, and allows the cassettes to be conveniently stored.

In the above-described second embodiment, two ribs 245 (or a step structure) may be provided similarly as in the first embodiment. Additionally, the second embodiment of the present invention offers advantages similar to that of the first embodiment described above regarding the width of the structure.

A third embodiment of the invention will be described with reference to FIGS. 8-11.

Figure 8:
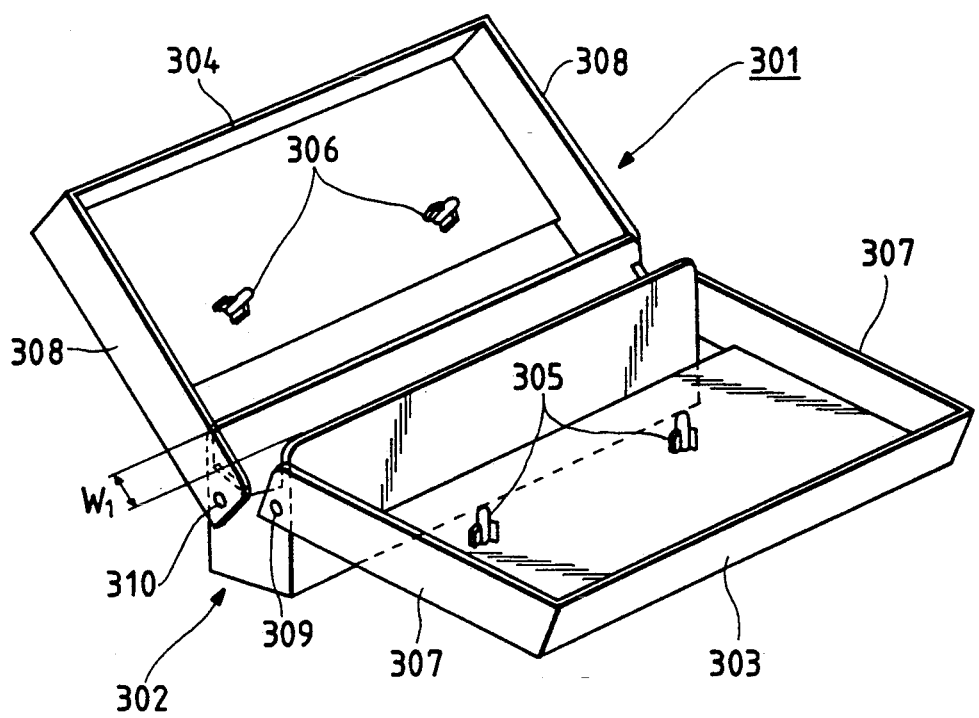
FIG. 8 is a perspective view of a magnetic tape cassette accommodating case which is a third embodiment according to the present invention.
Figure 9:
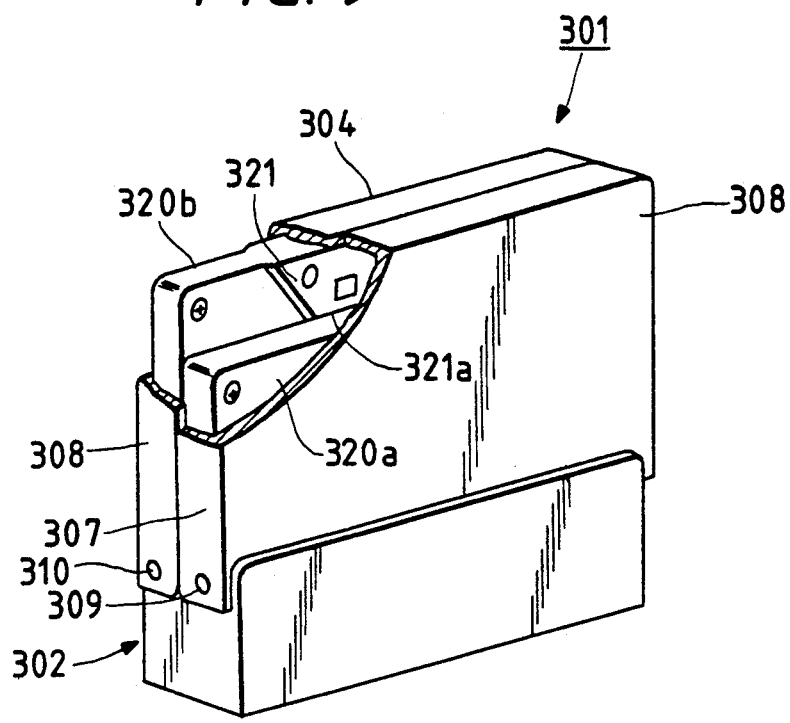
FIG. 9 is a partially sectional perspective view showing a state of accommodating cassettes in the case shown in FIG. 8.

As shown in FIGS. 8 and 9, a cassette accommodating case 301 has a pocket member 302 and first and second casing members 303, 304. The pocket member 302 has a space into which the front end portion of a first magnetic tape cassette 320a and the rear end portion of a second magnetic tape cassette 320b are inserted simultaneously while superposed upside down with respect to each other so that the relatively thick portion 321 of one of the cassettes does not overlap the relatively thick portion 321 of the other. The casing members 303, 304 are rotatably attached to both side portions of the pocket member 302 to confront each other when the case is closed. Thus, the cassette accommodating case 301 is designed so that the first and second casing members 303, 304 can be opened and closed like a door by inserting support projections 309, 310 arranged on the internal surfaces of the side wall portions 307, 308 of the first and second casing members 303, 304 into through holes arranged on both side ends of the pocket member 302.

The first and second casing members 303, 304 are provided with a pair of respective rotation stopping projections 305, 306. The rotation stopping projections are inserted into the hub holes 322 of the first and second magnetic tape cassettes 320a, 320b which are placed while superposed one upon the other. The rotation stopping projections 305, 306 are not located to confront each other when the first and second casing members 303, 304 are closed, but are located to correspond to the positions at which the first and second magnetic tape cassettes 320a, 320b are received.

The internal width W of the pocket member 302 is set to a value substantially equal to the sum of a thickness twice that of the thickness of the portion of a magnetic tape cassette other than its relatively thick portion and a thickness which is half the increased thickness of the thick portion. To accommodate the two magnetic tape cassettes 320a, 320b in the cassette accommodating case 301, these magnetic tape cassettes are inserted so as to be superposed upside down with respect to each other, so that the relatively thick portion 321 of one of the magnetic tape cassettes does not overlap the thick portion of the other magnetic tape cassette. This allows the rear edges of the magnetic tape cassettes 320a, 320b to be held by the shoulders 321a of their thick portions 321, thereby to allow smooth insertion of the two magnetic tape cassettes.

The insertion of the cassettes is complete when the front end surface of the magnetic tape cassette 320a abuts the bottom end of the pocket member 302, and when the first and second casing members 303, 304 are closed, the rotation stopping projections 305, 306 are inserted into the hub holes 322 of the respective magnetic tape cassettes 320a, 320b, thereby securely preventing the magnetic tapes of the magnetic tape cassettes 320a, 320b from being slackened. Since the rear end surfaces of the magnetic tape cassettes 320a, 320b are held by the shoulders 321a of their thick portions 321 when the cassettes are accommodated as shown in FIG. 9, it is unlikely that the magnetic tape cassette 320b will slip off.

Since the internal width $W_1$ of the pocket member 302 can be set to a value substantially equal to the sum of a thickness twice the thickness of the portion of a magnetic tape cassette other than its relatively thick portion and a thickness half the increased thickness of the thickened portion, the thickness of the cassette accommodating case 301 can be made smaller than that of the conventional cassette accommodating case having an internal width which is substantially equal to the sum of a thickness of the portion of a cassette other than its thick portion and the thickness of the thick portion. Therefore, a thin cassette accommodating case which can be easily stored is provided.

Another modification of the third embodiment of the invention similar to that described above but which implements an even thinner cassette accommodating case, will be described in detail hereinbelow.

Figure 10:
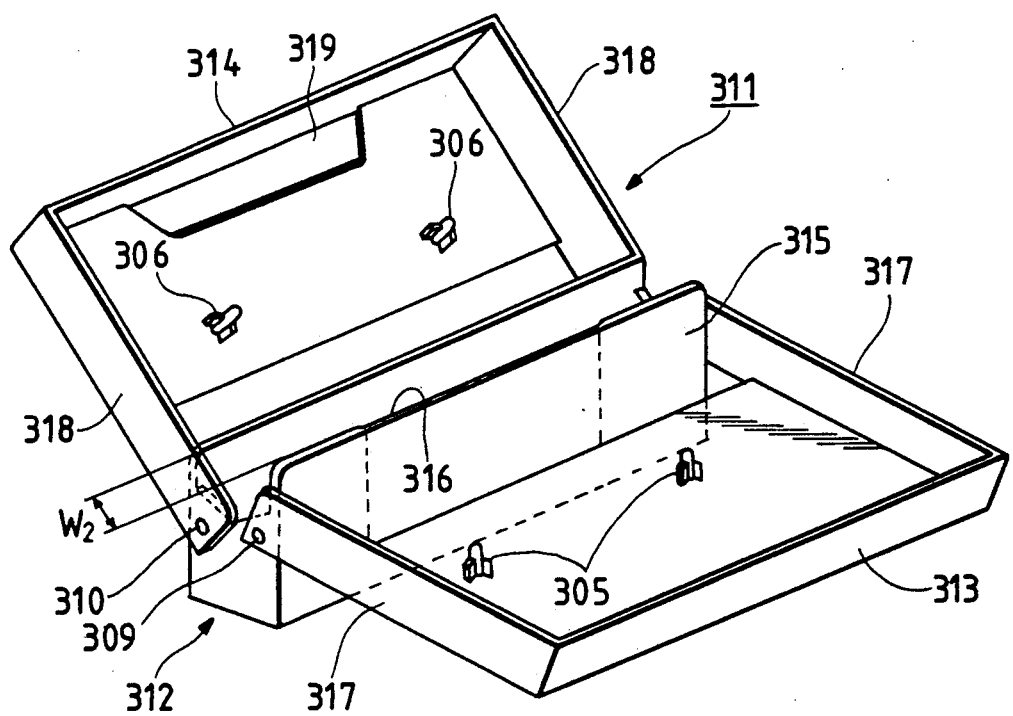
FIG. 10 is a perspective view of a magnetic tape cassette accommodating case which is another embodiment according to the invention.
Figure 11:
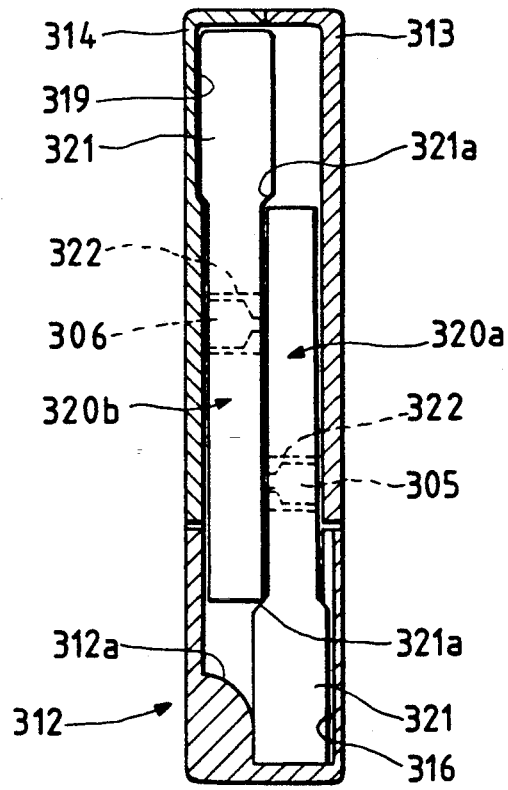
FIG. 11 is a transverse sectional view showing a state of accommodating cassettes in the case shown in FIG. 10.

As shown in FIGS. 10 and 11, a cassette accommodating case 311 has a pocket member 312 and first and second casing members 313, 314. The pocket member 312 has a space into which the front end portion of a first magnetic tape cassette 320a and the rear end portion of a second magnetic tape cassette 320b are inserted simultaneously while superposed upside down with respect to each other so that the relatively thick portion 321 of one of the cassettes does not overlap the relatively thick portion 321 of the other cassette. The casing members 313, 314 are rotatably attached to both side portions of the pocket member 312 to confront each other when closed. Similarly to the above-described embodiment, this cassette accommodating case 311 is designed so that the first and second casing members 313, 314 can be opened and closed like a door, and on the first and second casing members 313, 314 are pairs of rotation stopper projections 305, 306.

The internal width $W_2$ of the pocket member 312 is set to a value which is substantially equal to a thickness twice that of the portion of a magnetic tape cassette other than its relatively thick portion. On the internal surface of a wall portion 315 of the first casing member 313 that forms the pocket member 312 is a first recess 316 for receiving the relatively thick portion 321 of the first magnetic tape cassette 320a that is located on the internal wall portion 315. In the vicinity of the opening and closing end of the second casing member 314 is a second recess 319 for receiving the thick portion 321 of the second magnetic tape cassette 320b that is located on the second casing member 314.

To accommodate the first and second magnetic tape cassettes 320a, 320b in the cassette accommodating case 311, first, these cassettes are superposed upside down with respect to each other so that the thick portion 321 of one of the cassettes does not overlap the thick portion 321 of the other cassette. Then, the thick portion 321 of the first magnetic tape cassette 320a is positioned and inserted into the first recess 316. As a result, both cassettes are inserted into the pocket member 312 smoothly.

The insertion of the cassettes is completed when the front end surface of the first magnetic tape cassette 320a abuts the bottom end of the pocket member 312, and when the first and second casing members 303, 304 are closed, the rotation stopping projections 305, 306 are inserted into the hub holes 322 of the respective magnetic tape cassettes 320a, 320b, thereby securely holding the magnetic tapes of the magnetic tape cassettes 320a, 320b and preventing them from slackening. The thick portion 321 of the second magnetic tape cassette 320b is received by the second recess 319. Since the rear end surfaces of the magnetic tape cassettes 320a, 320b are held by the shoulders 321a of their relatively thick portions 321 when the cassettes are received similarly to the above embodiment, it is unlikely that the magnetic tape cassette 320b will slip down.

Since the internal width $W_2$ of the pocket member 312 can be set to a value substantially equal to a thickness twice that of the thickness of the portion of a magnetic tape cassette other than its relatively thick portion, the thickness of the cassette accommodating case 311 can be made even smaller than the thickness of the cassette accommodating case 301 in the embodiment described just above.

As shown in FIG. 11, the arrangement of the ribs 312a inside the pocket member 312 to regulate the insertion position of the magnetic tape cassette 312 helps accommodate the first and second magnetic tape cassettes 320a, 320b easily.

The cassette accommodating case of the invention according to the third embodiment is not limited to the above constructions, but may be modified in various ways.

For example, the case may be constructed to accommodate three magnetic tape cassettes. In this case, it is necessary not only to increase the internal width of the pocket member, but also to arrange recesses for receiving the thick portions at positions confronting the pocket member. However, no recess is necessary on the casing members.

To accommodate four magnetic tape cassettes, it suffices that the internal width of the pocket member be set to a value twice the internal width described in connection with the above embodiments. Specifically, while the recess forming positions are different for a case accommodating an even number of cassettes than for a case accommodating an odd number of cassettes, the cases may be formed to be similarly thin as in the above embodiments.

Further, while the front and rear end portions of a plurality of magnetic tape cassettes are accommodated in the pocket member in the above embodiments, a side end portion of each magnetic tape cassette is accommodated in the pocket member, so that the casing members can be opened in the longitudinal direction.

The magnetic tape cassette accommodating case of the third embodiment according to the invention includes a pocket member for receiving an end portion of the magnetic tape cassette, and first and second casing members, each having rotation stopping projections. The casing members are arranged to be opened and closed by a pivotally attached portion. The internal thickness of the pocket member is set to a value large enough to snugly accommodate a plurality of magnetic tape cassettes that are superposed upside down with respect to one another so that the relatively thick portion of one of the magnetic tape cassettes does not overlap the relatively thick portion of the other magnetic tape cassette.

Thus, by accommodating a plurality of magnetic tape cassettes while superposed upside down with respect to each other so that the thick portion of one of the magnetic tape cassettes does not overlap the thick portion of the other, the total thickness of the cassette accommodating case can be made small. Therefore, a cassette accommodating case which can accommodate a plurality of magnetic tape cassettes has a small total thickness and can be easily and conveniently stored.

A fourth embodiment of the invention along with modifications thereto will hereunder be described with reference to FIGS. 12 to 19.

This embodiment also has two cassettes which are accommodated while superposed in a case having a thin structure and utilized with a cassette accommodating case 401.

The cassette accommodating case 401 of this embodiment includes a partitioning member 402, pockets 404 provided on both sides at the lower end of the partitioning member 402, and a pair of casing members 403 rotatably attached to both ends of the pockets 404. Since the cassette accommodating case 401 has two symmetrical structures with respect to the partitioning member 402 therebetween, the parts on opposite sides are designated by the same reference numerals.

On one end portion of the plate-like partitioning member 402, i.e., on both sides of the lower end portion in this embodiment, are formed the pair of pockets 404, while on the other end portion, i.e., on the upper end portion, is formed a recess 405 for receiving trapezoidal portions 421 of the cassette 420 (e.g., relatively thick portions of the cassette). A pair of casing members 403 are rotatably mounted by inserting projections 406 provided on side plates 403a into holes 407 (shown in FIG. 13) provided on both end surfaces of the pockets 404.

Figure 14:
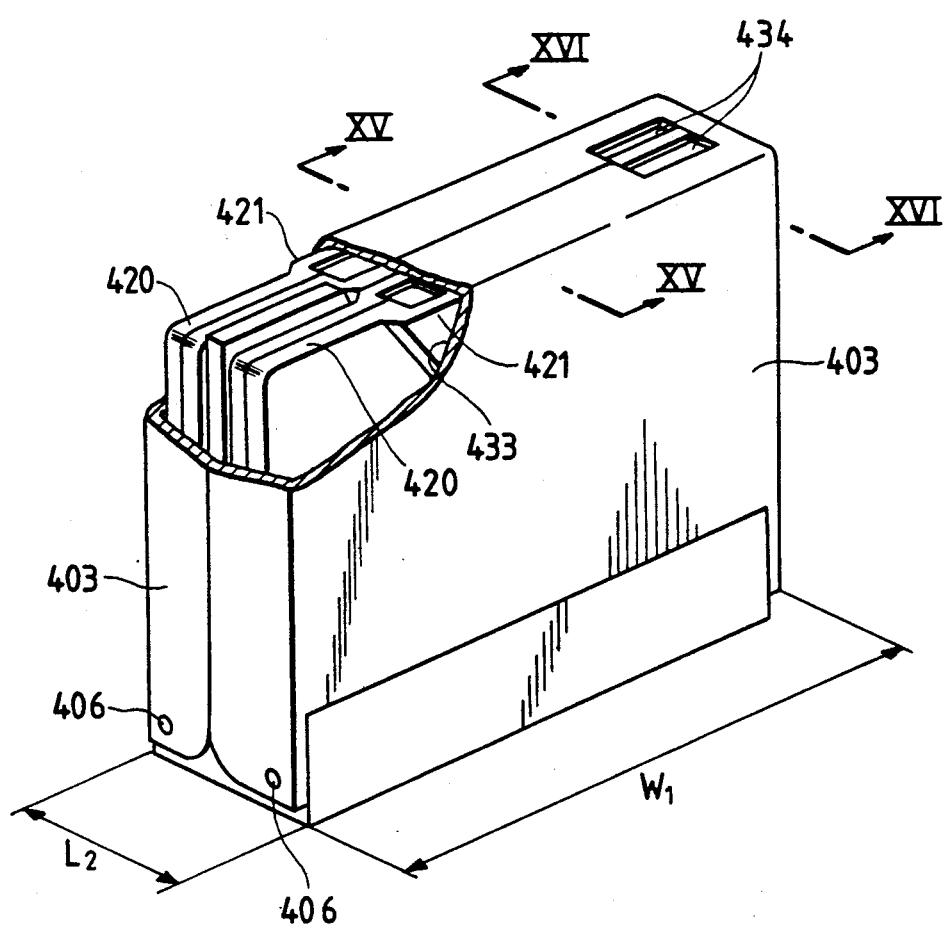
FIG. 14 is a perspective view of the magnetic tape cassette accommodating case with cassettes accommodated therein.

In the vicinity of the projections 406 are locking recesses 408, which are to be fitted with locking projections 409 formed on the pockets 404 when a pair of casing members 403 are closed, as shown in FIG. 14. Therefore, once closed, the pair of casing members 403 do not open unless they are biased to rotate by the operator's fingers, thereby preventing damage to the cassette 420 due to unexpected opening during its use.

Each wall portion 431 of the pair of casing members 403 is provided with rotation stopping projections 432, and, as shown in FIG. 14, recesses 433 for receiving the trapezoidal portions 421 with the case closed. Finger rests 434 that are used to open the pair of casing members 403 are arranged on each of the side wall portions 403a. These components will be described in connection with the operation of accommodating the cassette 420 hereinbelow in a respective pocket.

Figure 12:
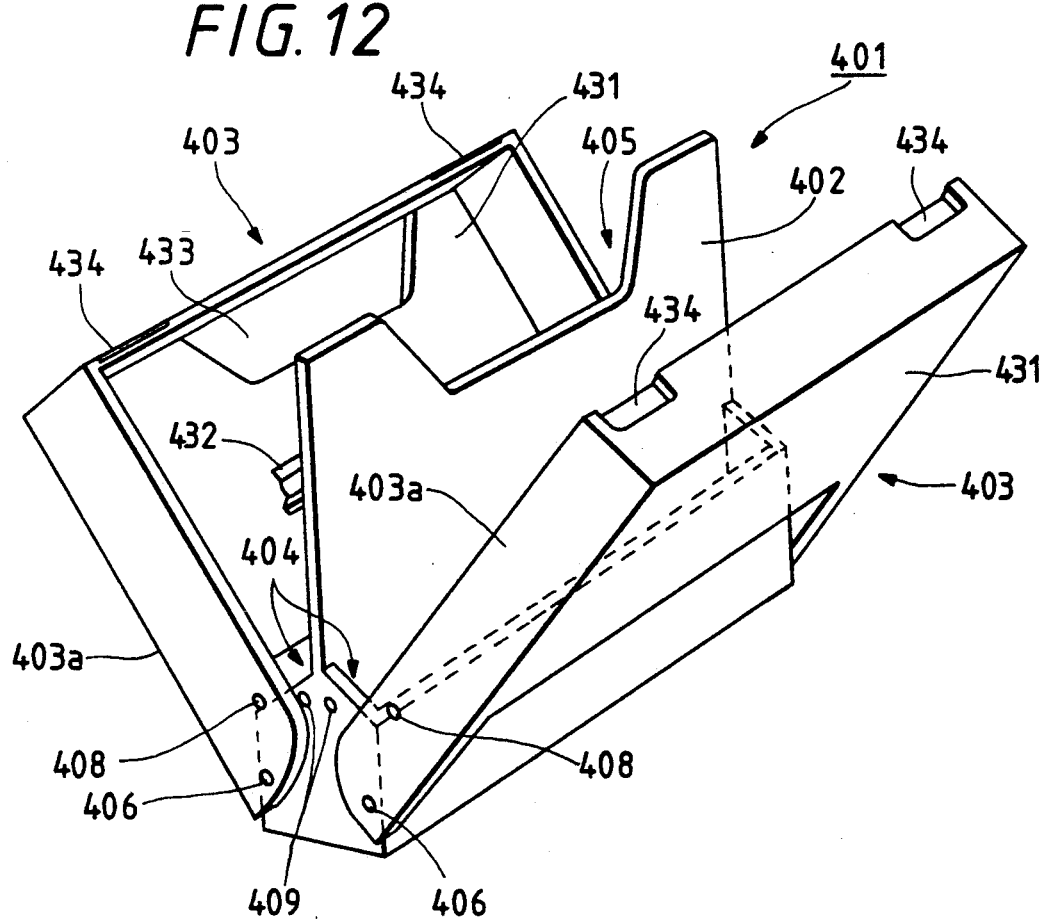
FIG. 12 is a perspective view of a magnetic tape cassette accommodating case, which is a fourth embodiment of the device.
Figure 15:
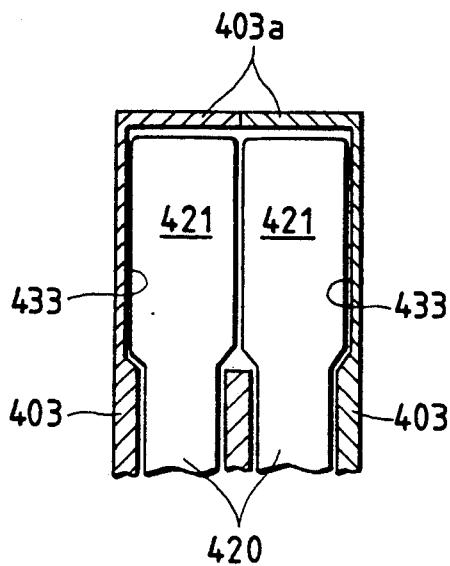
FIG. 15 is a sectional view taken along a line XV—XV shown in FIG. 14.

To put two cassettes 420 in the case, the pair of casing members 403 are opened as shown in FIG. 12, and the cassettes are inserted into the pockets 404 with their trapezoidal portions 421 up, or their rear ends down, as shown in FIG. 14. As a result, the two cassettes 420 are received in the respective pockets 404 with the single side of each trapezoidal portion received in the recess 405 formed both at the upper end and substantially in the middle of the partitioning member 402 as shown in FIGS. 14 and 15. When the pair of casing members 403 are closed under this condition, the two cassettes 420 are accommodated in the cassette accommodating case 401 as shown in FIG. 14. The rotation stopping projections 432 are inserted into shaft insertion holes 422 of the cassettes 420, thereby preventing the slackening of the tapes, and implementing a complete casing.

A unique feature of this embodiment is the manner in which the two cassettes 420 are received in the case. Specifically, the recess 405 is formed on the partitioning member 402 and the recesses 433 are also formed on the respective wall portions 431 of the pair of casing members 403 to confront the recess 405 when the pair of casing members 403 are closed. Therefore, as shown in FIG. 15, the sectional structure taken along a line XV—XV shown in FIG. 14 allows both sides of each of the trapezoidal portions 421 to be received by the recesses 405, 433.

As a result, the thickness of each trapezoidal portion 421 is essentially "canceled out" by the recesses 405, 433, thereby making the cassette accommodating case 401 compact even though two cassettes 420 are stored therein.

On the other hand, as shown in FIGS. 14 and 15, the front side surfaces of the pair of casing members 403 contact the partitioning member 402 to interpose both surfaces of the partitioning member 402 at the position shown by a line XVI—XVI in FIG. 14, with the upper end of the partitioning member 402 protruding from the finger rests 434. Accordingly, the casing members 403 can be opened by inserting the fingers of both hands into the respective finger rests 434 and biasing them outwardly.

If only one of the casing members 403 is to be opened, the operator's fingers are inserted into the finger rests 434 of the casing member 403 that is to be opened, while the fingers are also placed on the upper end of the partitioning member 402 with respect to the casing member that is not to be opened. As a result, the casing member 403 that is not to be opened is stationary as if biased by the partitioning member 402. Thus, the casing member 403 that is to be opened can be opened smoothly, while the casing member 403 which is not to be opened is kept so that it will not be opened unexpectedly, thereby preventing accidents such as falling down of the accommodated cassettes 420 and improving the handling convenience.

An exemplary size of the cassette accommodating case 401 will be described. The width W1 is the same as that of the conventional case shown in FIG. 20 However, the thickness L2 can be decreased by about 6 mm compared to merely combining the thickness of two cases in the conventional example because of the formation of the recesses 405, 433. The volume of the cassette accommodating case 401 is about 1.53 times the volume of a case accommodating a single cassette.

More specifically, the inventive case can accommodate two cassettes 420 by increasing the volume by 53% compared to the volume of the case for a single cassette. As a result, the storage space for two cassettes can be reduced and its handling convenience is enhanced. Additionally, the case can store two cassettes 420 relevant to each other (e.g., two cassettes which would be logically grouped together, thereby conveniently storing the cassettes.

Figure 17:
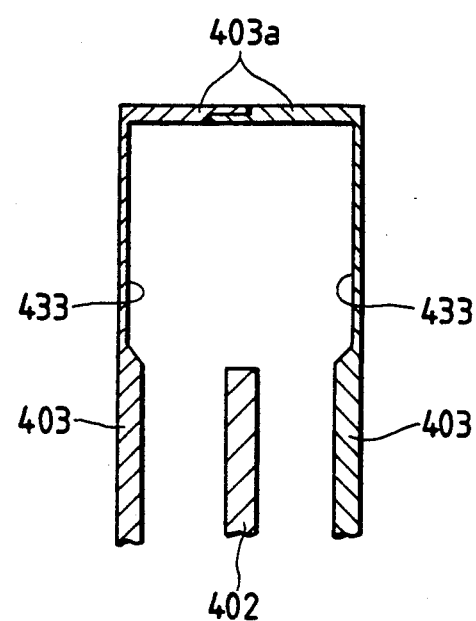
FIG. 17 is a sectional view showing the main portion of a another embodiment of the device.
Figure 16:
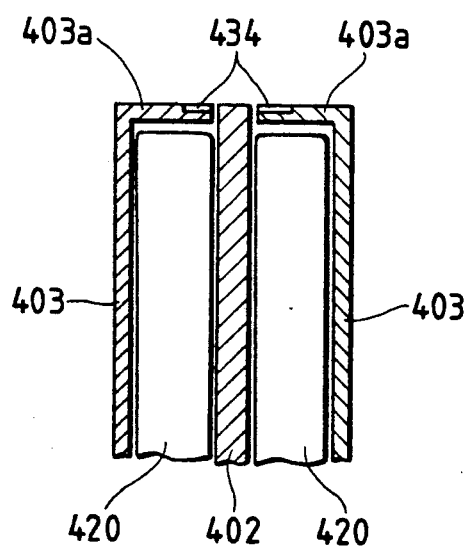
FIG. 16 is a sectional view taken along a line XVI—XVI shown in FIG. 14.
Figure 18:
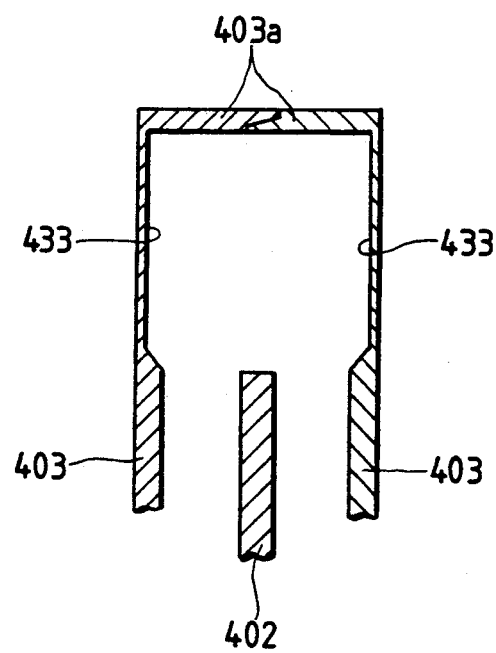
FIG. 18 is another sectional view showing the embodiment of FIG. 17.

Another aspect of this embodiment will be described with reference to FIGS. 17 and 18, which relate to the engagement structure between the side plates 403a of the pair of casing members 403. FIGS. 17 and 18 are sectional views taken along the line XV—XV of FIG. 14. FIG. 17 shows the engagement between the casing members having a stepped form, while FIG. 18 shows an engagement in tapered form.

In the embodiment shown in FIG. 15, the engagement of the pair of casing members 403 is between flat ends. Such a design may admit dust through the gap, thereby making it likely for dust to adhere to the magnetic tape (not shown), and also causing the operator's fingers to interfere with opening the case.

Therefore, as shown in FIGS. 17 and 18, the pair of casing members 403 are engaged to be overlapped. This structure prevents dust from entering through the interface of the two casing members, and also prevents the operator's fingers from touching the opened portion of the cassette because it is difficult to open the case while putting the fingers on this portion (e.g., the portion corresponding to the opened portion of the cassette).

Figure 13:
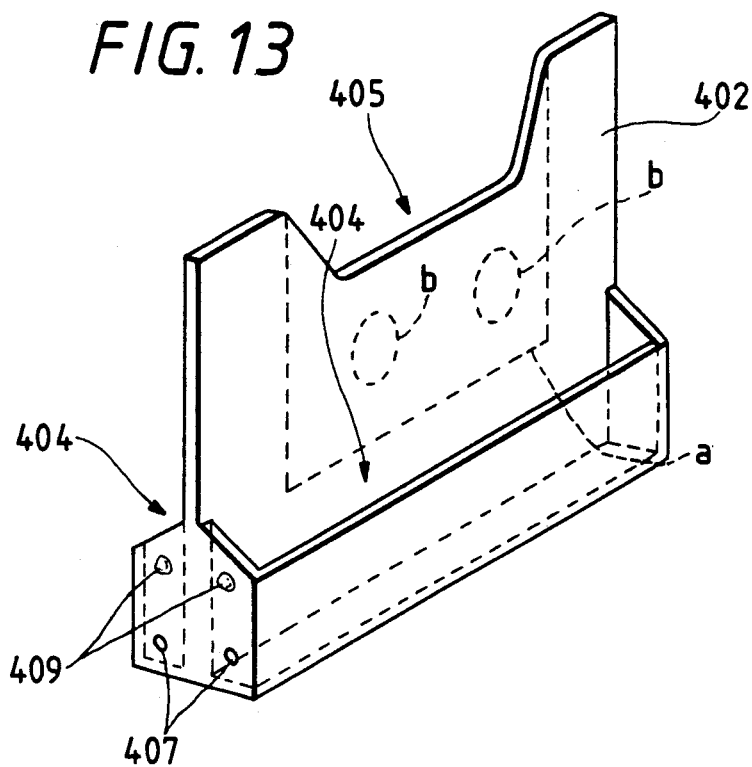
FIG. 13 is a perspective view of a partitioning member.
Figure 19:
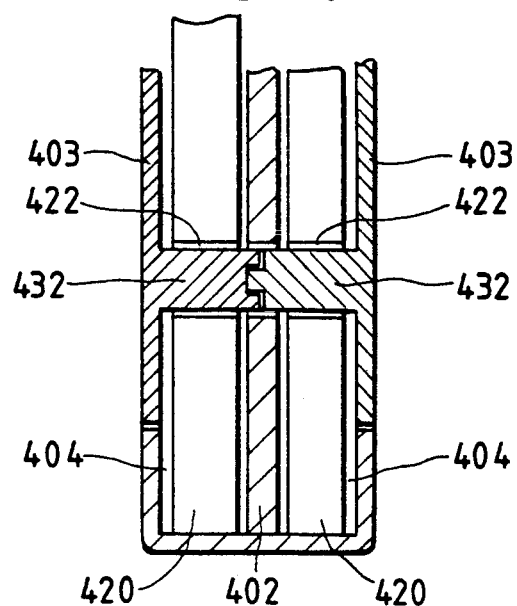
FIG. 19 is a sectional view showing the main portion of yet another embodiment of the device.

Yet another aspect of the invention will be described with reference to FIGS. 13 and 19 hereinbelow and which relates to the rotation stopping projections. With respect to the partitioning member 402, either a deeply cut recess 405 such as shown by dotted line a in FIG. 13 is formed, or holes b having a large diameter are arranged at positions at which the shaft insertion holes 422 are positioned when the cassettes 420 are inserted into the case. On the other hand, with respect to the rotation stopping projections 432, engagement structures are provided on their ends as shown in FIG. 19, so that the rotation stopping projections are inserted into the large diameter holes b to engage each other, or the rotation stopping projections are inserted through the deeply cut recess a to engage each other.

According to these engagement structures, the casing members 403 are secured by the rotation stopping projections 432 when closed. Hence, the engaged portions of the rotation stopping projections 432 can be formed into an appropriate engagement structure. As a result, the locking mechanism including the holes 408 and the projections 409 described in connection with the embodiment above can be dispensed with. The locking holes 408 are formed on the side plates 403a, and their positioning on the plate portion makes them mechanically so fragile that they may be deformed, broken or cracked. However, the rotation stopping projections 432 are provided with projections, etc., that engage hub indents (not shown), making them mechanically stronger than the side plates 403a.

The rotation stopping projections 432 being coupled forms a supporting rod substantially in the middle of the case when the casing members are closed, thereby increasing the rigidity of the case and making the case compact. Therefore, according to this embodiment, the case can be handled without special care to improve the utility of the case. The engagement structure of the rotation stopper projections 432 is not particularly limited to the above example.

As described above, the cassette accommodating case according to the above embodiment of the invention is designed so that the lower ends of two magnetic tape cassettes are inserted into the pockets arranged on both sides of an end, e.g., the lower end, of the plate-like partitioning member and so that the confronting trapezoidal portions of the magnetic tape cassettes are commonly received by the recess formed on, e.g., the upper end of the partitioning member. The trapezoidal portions of the cassettes are also received by the respective recesses formed on the casing members when closed.

Therefore, the trapezoidal portions of the two magnetic tape cassettes are received by the recesses formed both on the partitioning member and on the pair of casing members, which allows the thickness of the case accommodating the two magnetic tape cassettes to be minimized.

Further, the finger rests arranged on both right and left sides along the length of the case assist the operator's fingers to grasp the respective casing members to open the case. The finger rests also keep the fingers from touching the opening portions of the cassettes, thus preventing the magnetic tapes from being contaminated, etc.

Additionally, the rotation stopping projections may be provided on both casing members to be coupled, so that a support rod is formed substantially in the middle of the case by the rotation stopping projections when the case is closed, thereby increasing the rigidity of the case. Hence, the case has a thickness which is minimized.

Although the present invention has been fully described by way of the preferred embodiments thereof with reference to the accompanying drawings, various changes and modifications will be apparent to those having skill in this field. Therefore, unless otherwise these changes and modifications depart from the scope of the present invention, they should be construed as included therein.

Further, a fifth embodiment of the present invention will be described next with reference to FIG. 20. This embodiment differs from the second embodiment in that the former not only allows the cassette accommodating case 201 to be thinner, but also enables three cassettes to be accommodated. Therefore, members in the fifth embodiment which perform the same functions as in the second embodiment are designated as the same reference numerals and their description will be omitted.

Figure 20:
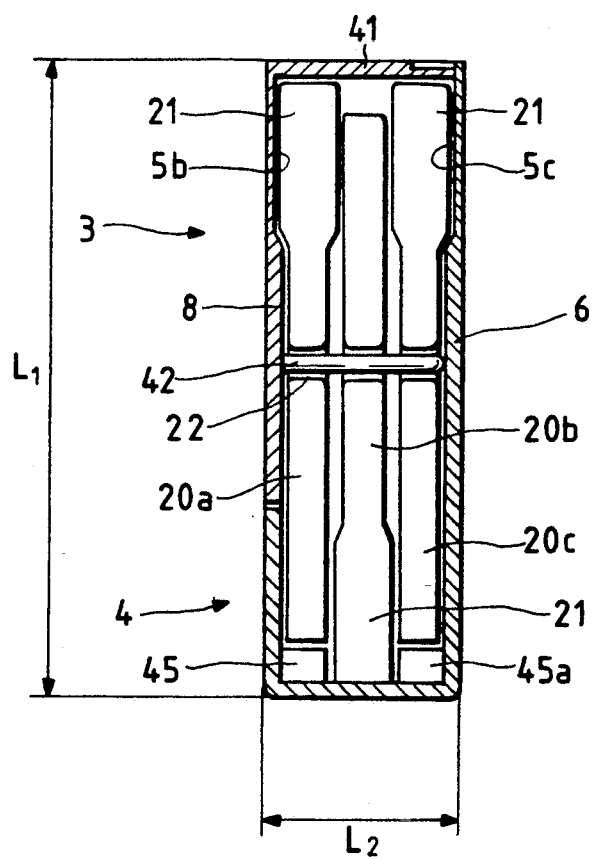
FIG. 20 is a sectional view of a cassette accommodating case, which is a fifth embodiment of the device.

As is apparent from a comparison between FIGS. 7 and 20, the cassette accommodating case 201 of this embodiment is constructed so that three cassettes 220a, 220b, 220c can be superposed so as to align their shaft insertion holes 222 and further arrange their thick portions 221 upside down.

To superpose the three cassettes 220a to 220c upside down and further align the shaft insertion holes 222, two ribs 245 shown in the second embodiment must be provided. Thus, in the fifth embodiment, a second rib 245a acting as the same as the rib 245 is provided at a position which is a corner of a large wall portion 206 and which confronts the rib 245.

To reduce the thickness of the cassette accommodating case 201, a recess 205c for receiving one of the thick portions 221 of the cassette 220c is formed on the opening side of the large wall portion 206. The recess 205c is located at a position confronting the recess 205b shown in the second embodiment.

According to the thus constructed cassette accommodating case 201, the shaft insertion holes 222 can be aligned by the help of the ribs 245, 245a even if as many as three cassettes 220a to 220c are superposed therein. And by inserting the three cassettes 220a to 220c into the pocket 204 while superposed and closing both the cover member 202 and the casing member 203 thereafter, the rotation stopping projections 242 get inserted into the shaft insertion holes 222, thereby preventing the tape from slackening.

The length L1 of the cassette accommodating case 201 is the same as that of the second embodiment, and its thickness L2, although increased by the thickness of the cassette 220c, can be reduced to a significant degree compared to the case where the cassettes are merely superposed, because the thick portion 221 can be received in the recess 205c.

A sixth embodiment of the device will be described next with reference to FIG. 21. This embodiment has the feature that the three cassettes 220a to 220c can be accommodated and that the length L1 is reduced.

In the second embodiment, it has been described with reference to FIG. 4 that the shaft insertion holes 222 are not aligned perfectly but are aligned partially when the thick portions of the two cassettes are superposed upside down. To overcome this problem, this embodiment is constructed so that, as shown in FIG. 21, the thick portions of the respective cassettes 220a to 220c are superposed upside down to allow the cassettes to be put in a cassette accommodating case 201.

In this case, since the three cassettes 220a to 220c are superposed without being staggered, the ribs 245, 245a described in connection with the first and fifth embodiments are no longer required. Thus, as shown in FIG. 21, no ribs are formed in this embodiment. However, the recess 205c for receiving the thick portion 221 of the cassette 220c is formed.

Figure 4:
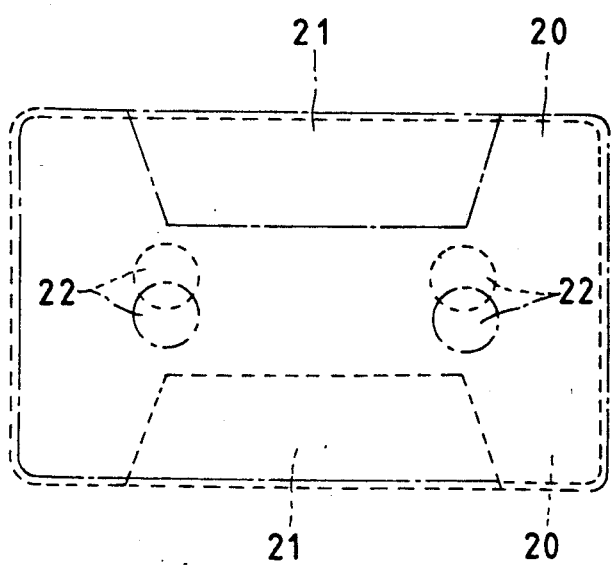
FIG. 4 is a plan view showing superposed cassettes which is a modification of the cassette accommodating case according to the first embodiment of the invention.

Since the shaft insertion holes 222 are narrowed, i.e., partially aligned, as shown by the solid line in FIG. 4, the rotation stopping projections 242a to be inserted into the shaft insertion holes 222 are formed into flat members so that they can be inserted into the narrowed portions.

Figure 21:
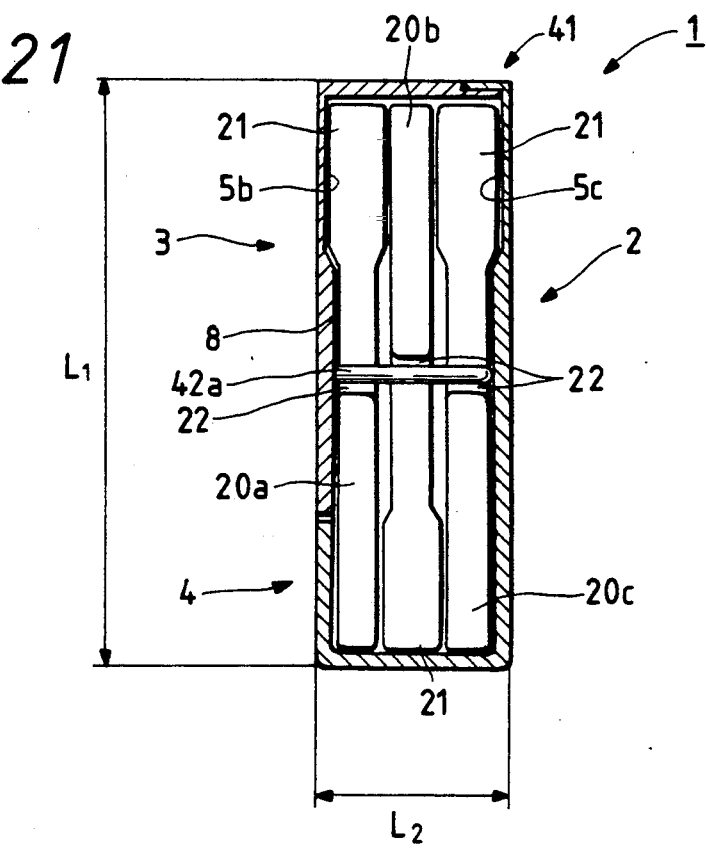
FIG. 21 is a sectional view of a cassette accommodating case, which is a sixth embodiment of the device.

According to the thus constructed cassette accommodating case 201, the three cassettes 220a to 220c are inserted into the pocket 204 while superposed as shown in FIG. 21 and the cover member and the casing member are thereafter closed, so that the rotation stopping projections 242a can be inserted into the shaft insertion holes 222. Therefore, it is ensured that the magnetic tape will not be rotated idly, and the length L1 can be reduced to an extent corresponding to the elimination of the ribs 245, 245a. The thickness L2 remains the same as in the fifth embodiment.

By the way, when the three cassettes 220a to 220c are superposed as in this embodiment, the shaft insertion holes 222 can be narrowed as described above when viewed from an inserting side. However, when viewed sectionally as in FIG. 21, they are aligned, although not straightly through.

Figure 5:
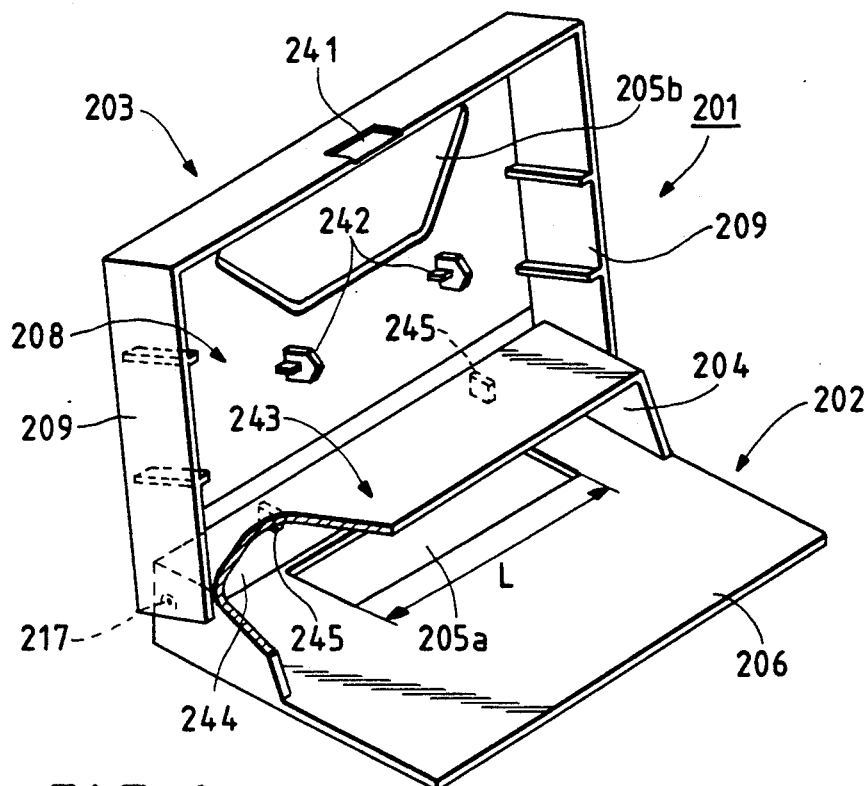
FIG. 5 is a perspective view of a cassette accommodating case which is a second embodiment of the invention.

Thus, the rotation stopping projections 242a may be formed into arcuate members so as to substantially correspond to its radius of gyration (a radius of gyration with the support projection 217 shown in FIG. 5 as an axis of rotation) and inserted. In such a case, the rotation stopping projections 242a can be made rather thick so that their rigidity can be improved.

A seventh embodiment of the device will be described next with reference to FIG. 22. This embodiment has the feature that the three cassettes 220a to 220c can be accommodated in a direction opposite to that of the fifth embodiment.

Figure 22:
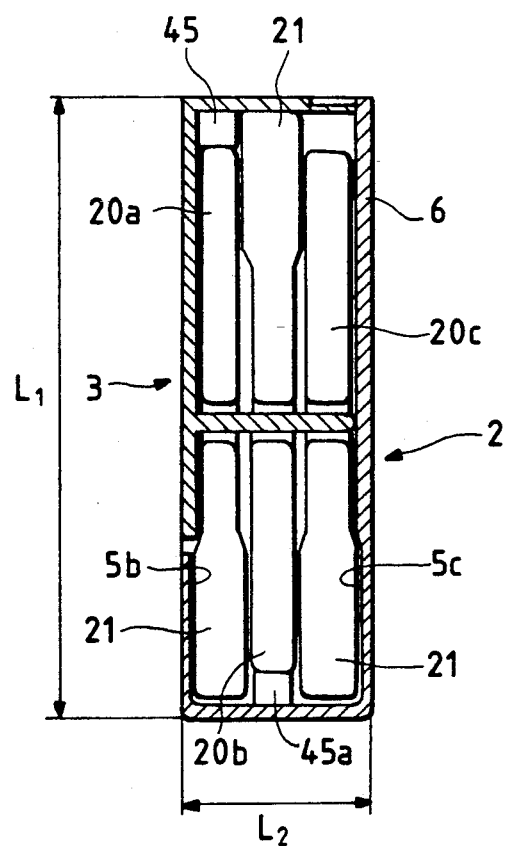
FIG. 22 is a sectional view of a cassette accommodating case, which is a seventh embodiment of the device.
Figure 23:
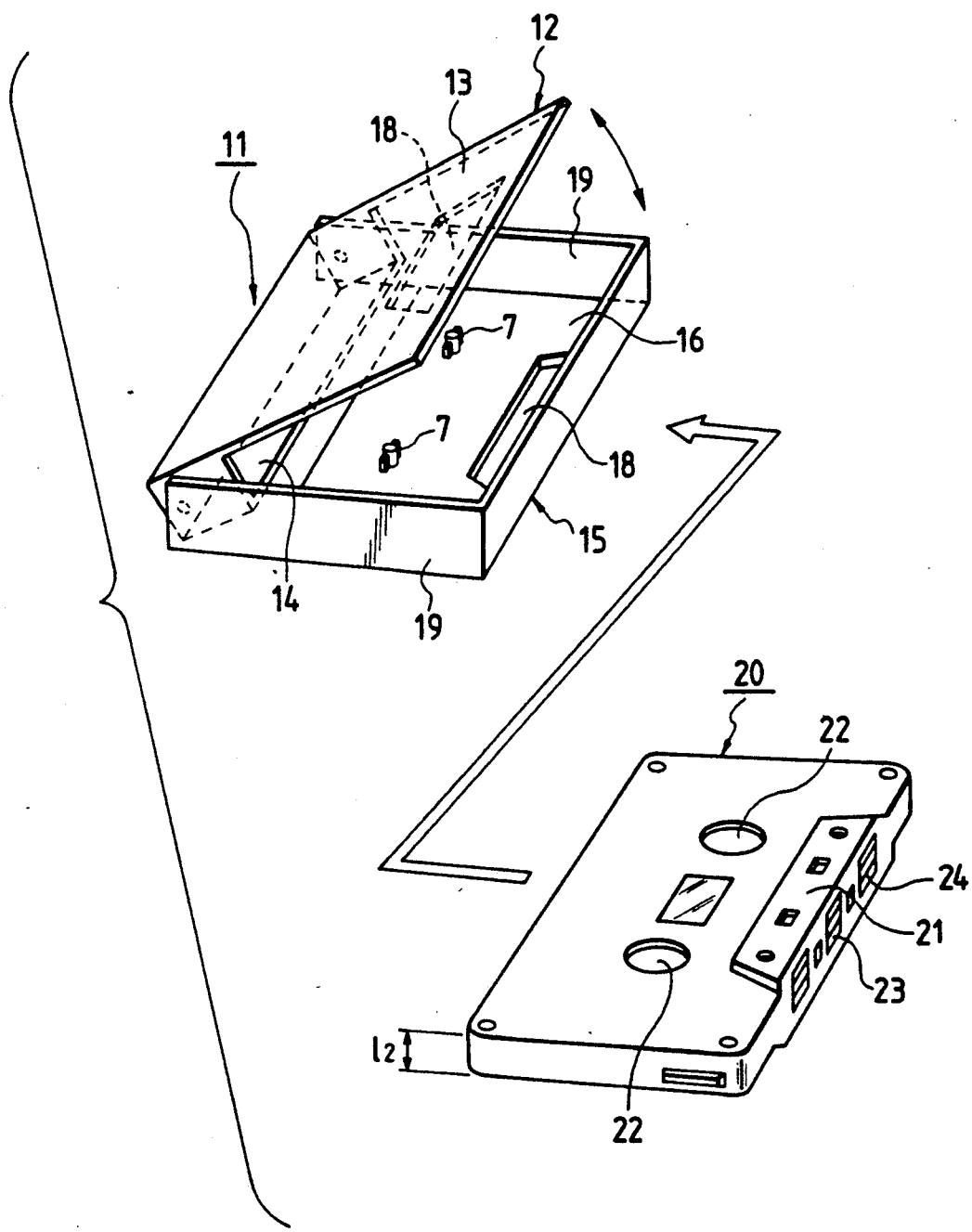
FIG. 23 is a perspective view showing a conventional cassette accommodating case.
Figure 24:
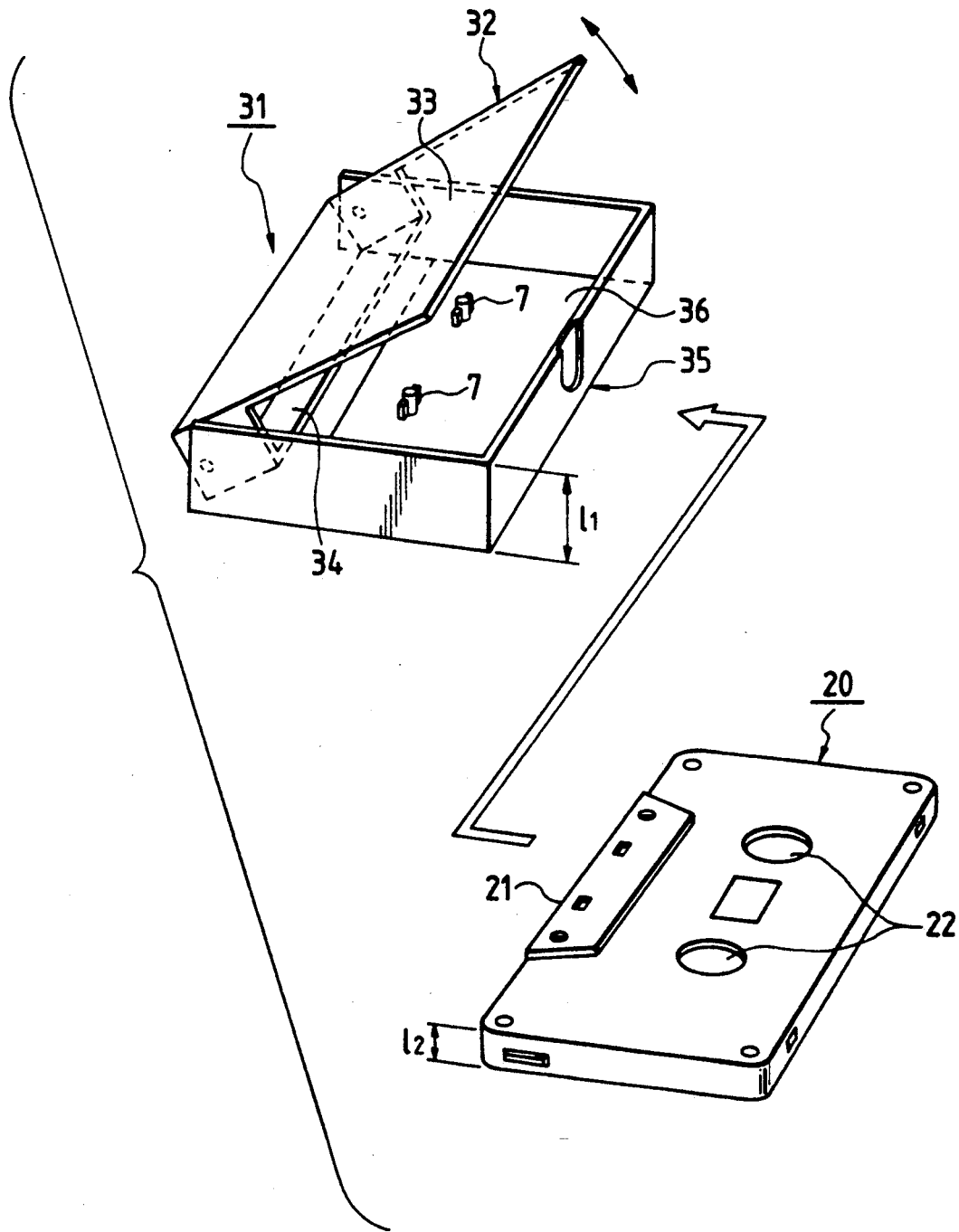
FIG. 24 is a perspective view showing another conventional cassette accommodating case.

As shown in FIG. 22, the recess 205c is formed on the inner surface of the large wall portion 206 defining the pocket 204, while the recess 205b is formed on the inner surface of the small wall portion 243. Therefore, the thick portions 221 of the respective cassettes 220a, 220c are to be received in the recesses 205b, 205c in the pocket 204.

The rib 245 is formed at the corner on the opening side of the casing member 203, while the rib 45a is formed in the middle portion of the pocket 204. Accordingly, the three cassettes 220a to 220c are placed in the cassette accommodating case 201 while superposed as shown in FIG. 22. Under the construction of this embodiment, the length L1 and the thickness L2 are the same as those in the fifth embodiment, but both ribs 245, 245a, acting as reinforcing members, contribute to improving the rigidity of the case 201 as a whole.

While the embodiments of the device have been described above, the device may also be modified in the following manner. As shown in the sixth embodiment, the cassettes may be received with their front and rear ends set flush.

The application of the device is not limited to the above-mentioned embodiments accommodating two or three cassettes, but may include embodiments accommodating four or more cassettes as derivatives of the embodiment accommodating two cassettes when any such derivative can accommodate an even number of cassettes, and as derivatives of the embodiment accommodating three cassettes when any such derivative can accommodate an odd number of cassettes.

As described above, the cassette accommodating case of the device is arranged so that a plurality of cassettes are superposed upside down with the thick portions of the thus superposed cassettes received in the recesses formed on the inner surfaces of the case.

Therefore, the thick portions of the plurality of cassettes can be superposed directly as staggered, and such staggered superposition contributes to substantially halving the projected thickness of each thick portion, thus allowing the cassette accommodating space to be reduced significantly compared to using a single case per cassette. In addition, the reception of the outermost thick portions in the respective recesses formed on the inner surfaces of the case allows the case itself to be thin, which contributes to reducing the space for accommodating cassettes. As a result, not only a plurality of cassettes can be stacked, i.e., accommodated as superposed, within one cassette accommodating case, but also long recorded information can be stored in group, thus improving user-friendliness compared to storing a plurality of related cassettes separately.

What is claimed is:

1. A cassette accommodating case adapted to store a plurality of magnetic tape cassettes each having shaft insertion holes, comprising:
    a cover member having a wall portion and a pocket for accommodating end portions of said plurality of magnetic tape cassettes;
    a casing portion having rotation stopping projections, said cover member and said casing member being pivotally assembled; and
    means for positioning at least one of said magnetic tape cassettes being provided inside said case, such that said plurality of magnetic tape cassettes are accommodated therein while superposed upside down with respect to each other and with said shaft insertion holes thereof being substantially aligned,
    wherein said pocket includes a first wall portion and a first recess portion for receiving a first portion of a first magnetic tape cassette formed on said first wall portion, and wherein a second recess portion for receiving a first portion of a second magnetic tape cassette is formed at a position spaced from said first recess portion on said wall portion of said cover member, said wall portion of said cover member facing said wall portion of said pocket.

2. A cassette accommodating case according to claim 1, wherein said pocket defines a space for receiving ends of a plurality of magnetic tape cassettes.

3. A cassette accommodating case according to claim 1, wherein said rotation stopping projections are inserted into said shaft insertion holes of said cassettes when said cassettes are inserted into said pocket and said cover member and said casing member are closed together.

4. A cassette accommodating case according to claim 1, wherein said pocket further includes a second wall portion which is perpendicular to said first wall portion of said pocket, and said positioning means comprises a plurality of ribs arranged at an intersection formed between said wall portion facing said first wall portion of said pocket and said second wall portion.

5. A cassette accommodating case according to claim 4, wherein said plurality of ribs align said shaft insertion holes of said magnetic tape cassettes when said magnetic tape cassettes are superposed in said case.

6. A cassette accommodating case according to claim 1, wherein said first recess portion for receiving said first portion of said first magnetic tape cassette extends to an edge of said first portion of said pocket to admit said first magnetic tape cassette into said case without interference.

7. A cassette accommodating case according to claim 1, wherein said positioning means includes a step formed on said wall portion of said case.

8. A cassette accommodating case according to claim 1, wherein said plurality of cassettes accommodated in said case are superposed to have their contours coinciding with each other.

9. A cassette accommodating case according to claim 8, wherein an opening of each of said shaft insertion holes of said plurality of magnetic tape cassettes has a flattened form.

10. A cassette accommodating case according to claim 1, wherein said rotation stopping projections each have a length which coincides with a depth of said shaft insertion holes.

* * * * *